(12) United States Patent
Shaff (10) Patent No.: US 7,072,696 B2
(45) Date of Patent: Jul. 4, 2006

(54) SOLAR-POWERED MOBILE TELEPHONE

(76) Inventor: Mari Shaff, 215 Little Lake Rd., Hutto, TX (US) 78634

( * ) Notice: Subject to any disclaimer, the term of this patent is extended or adjusted under 35 U.S.C. 154(b) by 0 days.

(21) Appl. No.: 10/710,151

(22) Filed: Jun. 22, 2004

(65) Prior Publication Data

US 2005/0282591 A1    Dec. 22, 2005

(51) Int. Cl.
*H04B 1/38* (2006.01)
(52) U.S. Cl. .................. 455/572; 455/563; 455/231; 455/569.1; 455/93; 455/95; 704/270; 381/322
(58) Field of Classification Search ............ 455/572, 455/3.03, 563, 569.1; 204/231, 220; 381/322
See application file for complete search history.

(56) References Cited

U.S. PATENT DOCUMENTS

| 4,833,726 | A | 5/1989 | Shinoda et al. ........... 455/90.3 |
| 4,882,745 | A | 11/1989 | Silver ..................... 455/575.2 |
| 5,113,428 | A | 5/1992 | Fitzgerald ............... 455/575.2 |
| 5,551,065 | A | 8/1996 | Honore ..................... 455/66.1 |
| 5,978,689 | A | 11/1999 | Tuoriniemi et al. ...... 455/569.1 |
| 6,173,192 | B1 * | 1/2001 | Clark ......................... 455/563 |
| 6,574,599 | B1 * | 6/2003 | Lim et al. .................... 704/270 |
| 2002/0067825 | A1 * | 6/2002 | Baranowski et al. ........ 379/430 |
| 2003/0147545 | A1 * | 8/2003 | Wagner et al. .............. 381/322 |
| 2004/0204168 | A1 * | 10/2004 | Laurila .................... 455/569.1 |
| 2004/0266335 | A1 * | 12/2004 | Usui et al. ................. 455/3.03 |
| 2005/0065791 | A1 * | 3/2005 | Kim ........................... 704/231 |

FOREIGN PATENT DOCUMENTS

GB        2386027        * 3/2003

* cited by examiner

*Primary Examiner*—Joseph Feild
*Assistant Examiner*—David Q. Nguyen
(74) *Attorney, Agent, or Firm*—Michael B. Nichols (57) ABSTRACT

A mobile telephone apparatus is disclosed in which a solar power source is used to supplement battery power. A solar cell array is positioned on the surface of the telephone and supplies electric current to the telephone. A preferred embodiment of the present invention is equipped with speech recognition software that allows the user to issue commands (such as dialling the telephone) verbally to the telephone. In addition, this speech recognition may be used to operate an integrated AM/FM broadcast radio to allow the telephone to double as a radio. In an alternative embodiment, the solar mobile telephone is integrated into a headset to allow for convenient hands-free operation.

8 Claims, 9 Drawing Sheets

SOLAR-POWERED MOBILE TELEPHONE

TECHNICAL FIELD

The present invention relates generally to the area of mobile/wireless communication devices, and, more specifically, to a mobile telephone utilizing a solar power source.

BACKGROUND ART

Traditionally, mobile telephones rely on some form of rechargeable battery pack to power the transmission and reception of wireless signals, as well as the control circuitry of telephone itself. Indeed the mobility of a mobile telephone depends upon the ability of the telephone to be supplied power without being connected to a wired telephone network or to AC line/mains power. Clearly, then, the usefulness of a mobile telephone is largely a function of its battery life, i.e., the maximum amount of operating time that may elapse between battery chargings. When charging is required, it must generally be performed by physically connecting the mobile telephone to some electric power source, such as an electrical outlet (via an AC adapter) or an automobile cigarette lighter socket. What is needed, then, is a mobile telephone with an extended battery life, which is less dependent upon frequent physical connection to external sources of power. The present invention provides a solution to this and other problems, and offers other advantages over previous solutions.

SUMMARY OF THE INVENTION

A preferred embodiment of the present invention provides a mobile telephone apparatus in which a solar power source is used to supplement battery power. A solar cell array is positioned on the surface of the telephone and supplies electric current to the telephone. This current may be used to supplement the current provided by an attached battery, thus preserving the life of the battery. Further, during periods of low or no power consumption, solar power may be used to recharge the battery.

A preferred embodiment of the present invention is equipped with speech recognition software that allows the user to issue commands (such as dialling the telephone) verbally to the telephone. In addition, this speech recognition may be used to operate an integrated AM/FM broadcast radio to allow the telephone to double as a radio.

In an alternative embodiment, the solar mobile telephone is integrated into a headset to allow for convenient hands-free operation. This headset configuration is convenient in that it provides the solar cell array with optimal sun exposure. The headset configuration provides that additional advantage of allowing the user to listen to radio broadcasts in stereo.

These and various other features and advantages that characterize the present invention will be apparent upon reading of the following detailed description and review of the associated drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
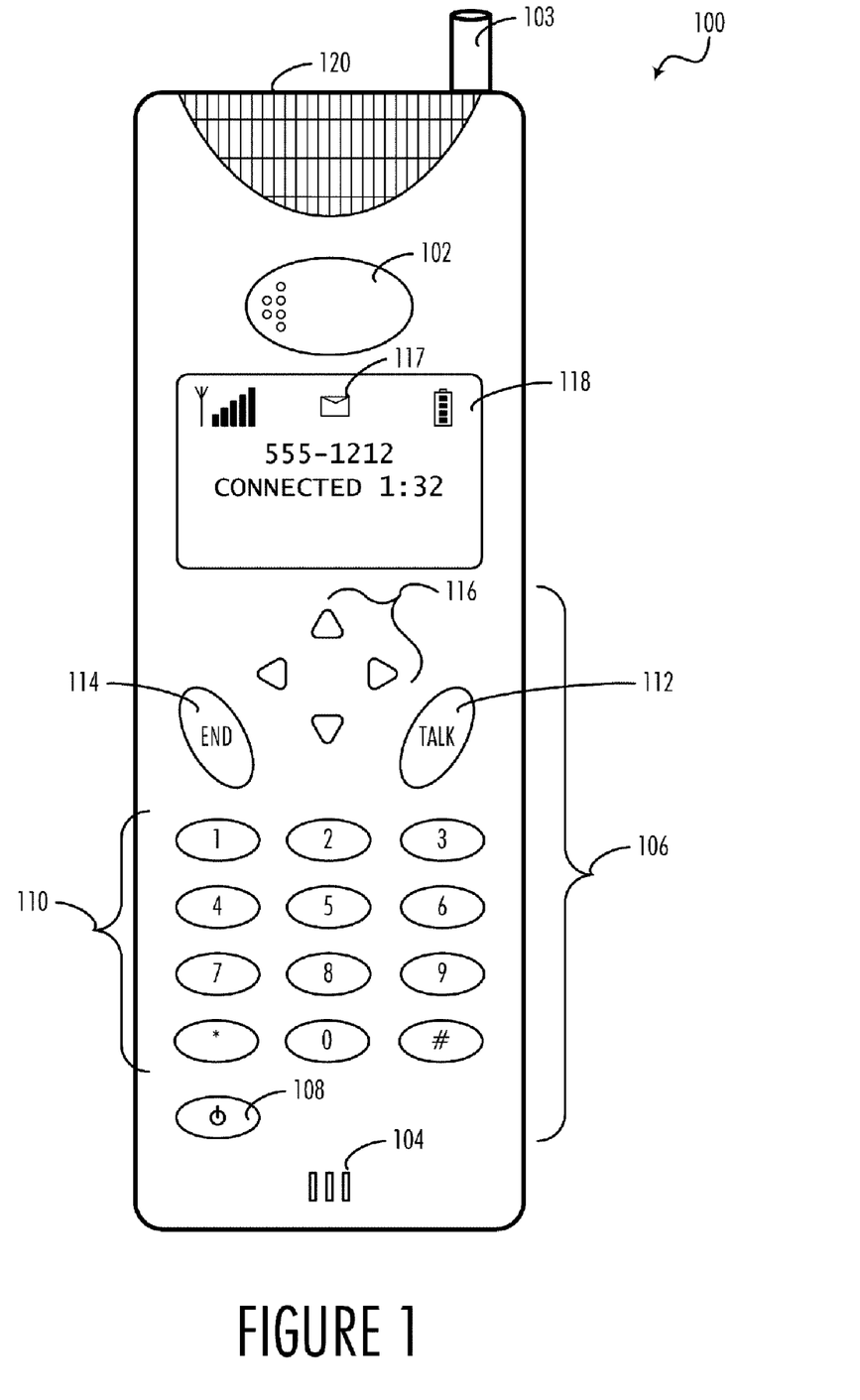
FIG. 1 is a pictorial diagram depicting a front view of a mobile telephone constructed in accordance with a preferred embodiment of the present invention.

FIG. 1 depicts a mobile telephone 100 constructed in accordance with a preferred embodiment of the present invention. Like a conventional telephone, mobile telephone 100 contains an earpiece 102, a microphone 104, and a keypad 106 for emitting DTMF (Dual-Tone Multiple Frequency) tones for dialing. Mobile telephone 100, unlike a conventional telephone, uses an antenna 103 as its communications link to the Public Switched Telephone Network (PSTN), the standard public telephone network through which most telephone calls are routed. Mobile telephone 100 may transmit and receive data, including but not limited to voice data, through an analog-coded or digitally coded signal. One common communications standard for mobile telephones is GSM (Global System for Mobile communications), which is an international standard for digital wireless telephony. Some mobile telephones, such as dual-band mobile telephones, will allow multiple frequency bands or even multiple communications standards to be used with the same telephone; this is a convenience, particularly in remote areas where some communications standards are not available.

Mobile telephone 100 includes a "talk" button 112 and an "end" 114 button for initiating and terminating calls, respectively. To dial another telephone, a user enters the telephone number for that telephone using numeric portion 110 of keypad 106 and presses "talk" button 112 to place the call. To "hang up" or terminate the call, the user presses "end" button 114.

Mobile telephone 100 also includes a liquid-crystal (LCD) display 118 for indicating to a user the status of mobile telephone 100, including such information as the current signal strength, whether the user has received a voice or text message, and the current level of battery power. In some mobile telephones, display 118 may be used for executing software, such as games, or for browsing World Wide Web documents loaded from the Internet through a wireless connection using antenna 103. Arrow keys 116 may be used to navigate a user interface (for example, by manipulating a menu bar) in display 118.

A user of mobile telephone 100 will generally rely on a service provider to provide a wireless gateway into the PSTN. In addition to allowing a user to send and receive telephone calls, a service provider may provide additional features to customers. One of these features, as was already mentioned, is wireless Internet access. Another is voice mail. If the user of the mobile telephone 100 is unavailable (i.e., has turned off mobile telephone 100, is already talking to someone using mobile telephone 100, or simply ignores the ringing mobile telephone 100), a caller calling mobile telephone 100 can be switched into a voice mail service, where the caller can leave a message for the user of mobile telephone 100. An indicator, such as an envelope icon (e.g., envelope icon 117), can appear in display 118. The user of mobile telephone 100 can later access the voice mail service by pressing a special voice-mail button or by calling a special telephone number (such as *123, for instance). The user can then use keypad 106 to enter DTMF tones to select recited voice mail menu options.

A preferred embodiment of the present invention includes additional features that enhance its usability. A speech recognition capability is included so that a user may dial a telephone number by reciting the digits, and possibly some form of terminating expression (such as "send"), into microphone 104. For example, to dial the telephone number 555-1212, a user may recite "five, five, five, one, two, one, two . . . send," or some similar expression.

This speech recognition can also be used to perform various other functions with respect to mobile telephone 100. For example, in a preferred embodiment of the present invention, mobile telephone 100 has the capability of doubling as a radio (e.g., for receiving AM or FM broadcast radio signals). A user may choose to listen to a particular radio station by reciting into microphone 104 an expression such as "radio, FM, eighty-nine point 5" (to listen to 89.5 FM, for example). To return mobile telephone 100 to "mobile telephone mode," one could then recite an expression such as "dial tone" or "telephone mode" into microphone 104.

Figure 2:
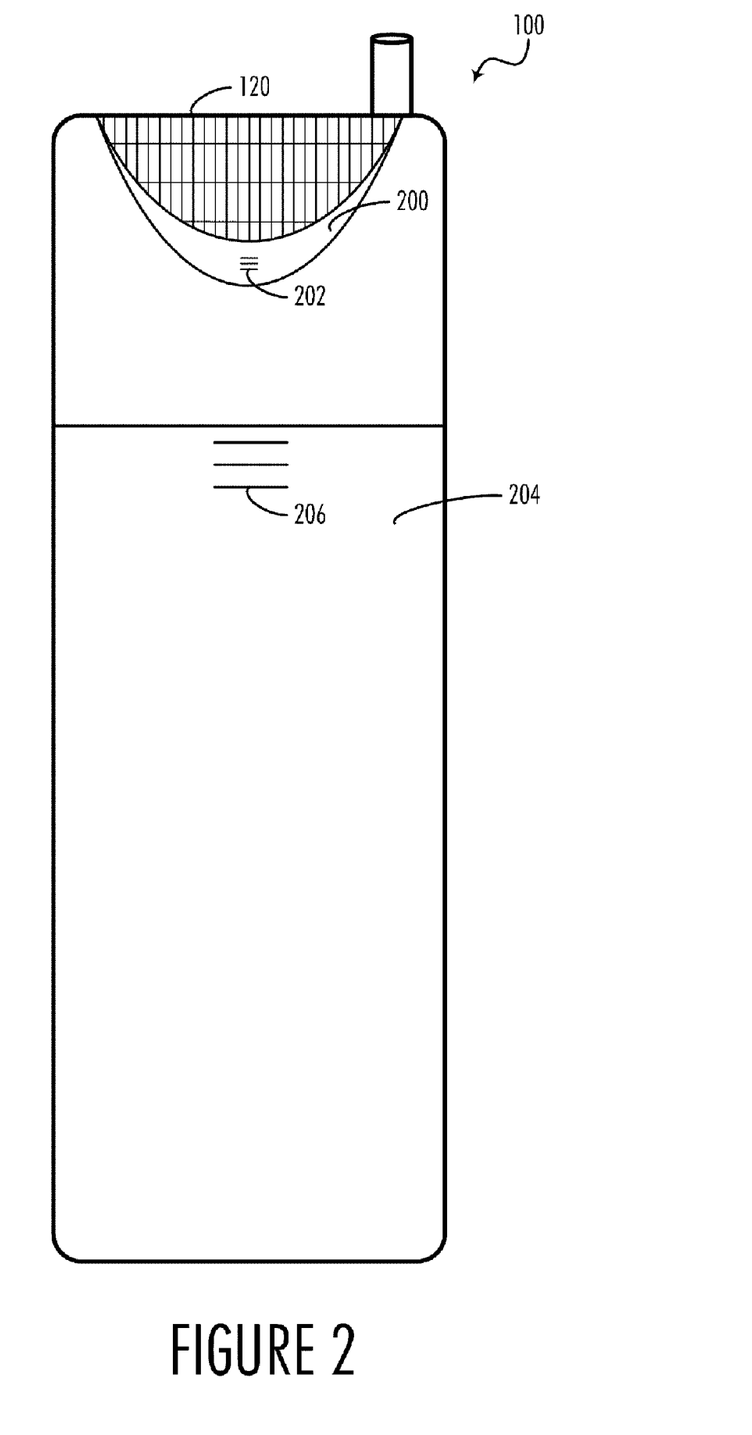
FIG. 2 is a pictorial diagram depicting a rear view of a mobile telephone constructed in accordance with a preferred embodiment of the present invention.
Figure 3A:
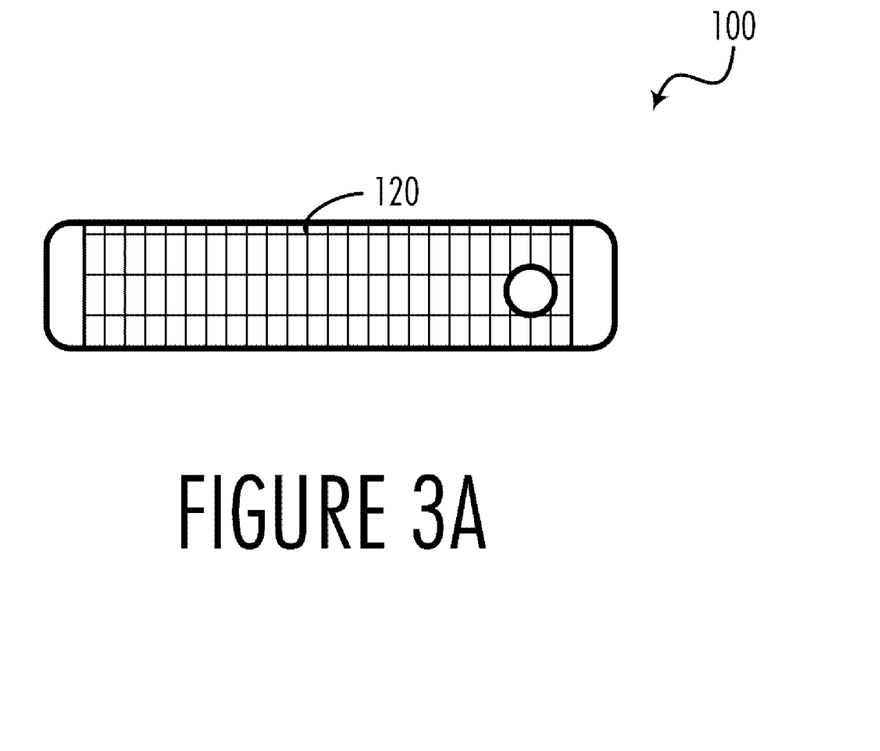
FIG. 3A is a pictorial diagram depicting a top view of a mobile telephone constructed in accordance with a preferred embodiment of the present invention.
Figure 4:
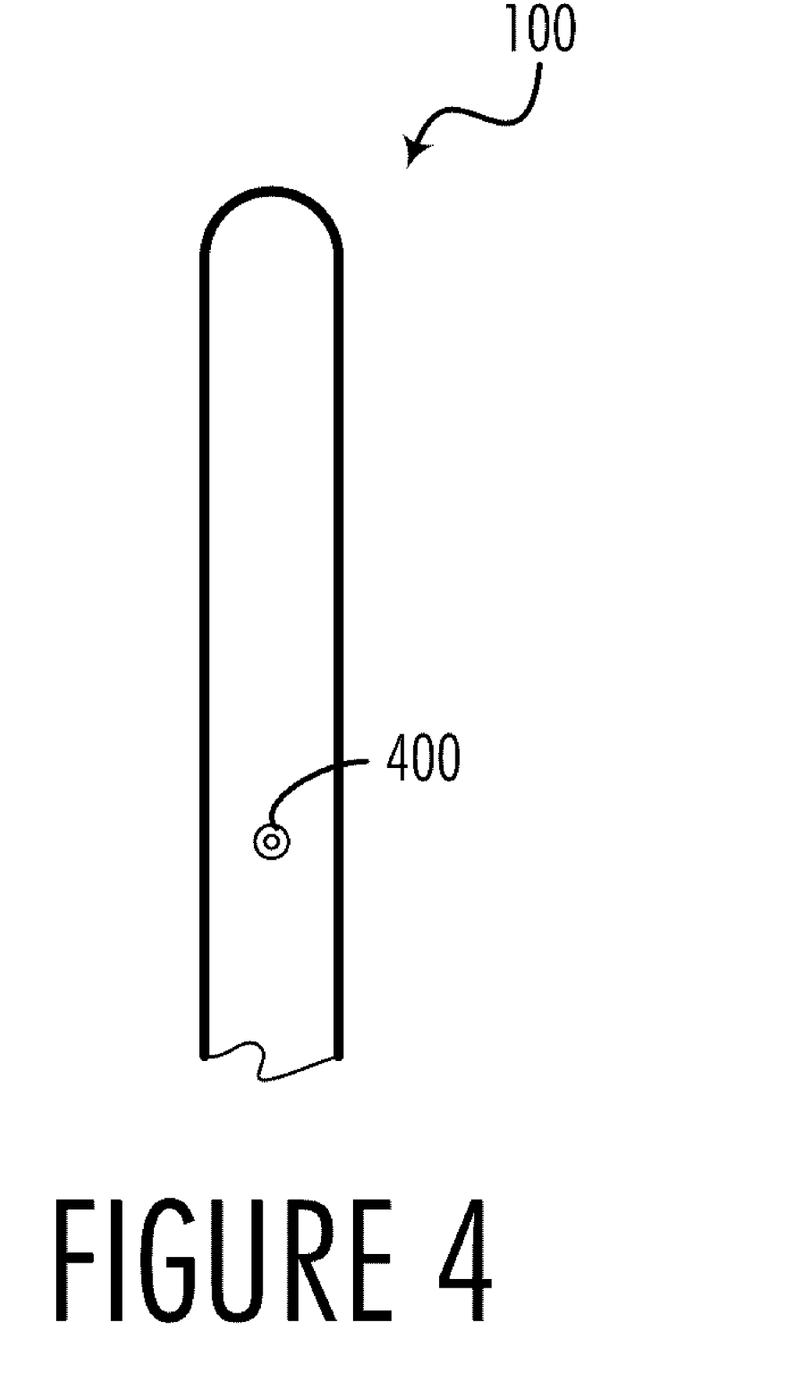
FIG. 4 is a pictorial diagram depicting a side view of a mobile telephone constructed in accordance with a preferred embodiment of the present invention.

Mobile telephone 100 includes an array of solar cells 120, which provide a source of electric power to mobile telephone 100. Mobile telephone 100 will generally also run on some kind of battery power using a rechargeable battery pack, or the like. Solar cells 120 may supplement, and hence reduce mobile telephone 100's reliance on, battery power. Solar cells 120 may also be used to recharge mobile telephone 100's battery pack when mobile telephone 100 is not transmitting. To further conserve energy when mobile telephone 100 is not needed, power button 108 may be used to turn off and later turn on mobile telephone 100. When mobile telephone 100 is turned off, it cannot send or receive calls. As shown in FIG. 2 and FIG. 3A, solar cell array 120 may extend to the back and top of mobile telephone 100. In a preferred embodiment, solar cell array 120 covers much of the surface of a removable assembly 200 (removable via thumb grip 202), as depicted in FIG. 2. Removing assembly 200 (and its attached solar cell array 120) allows access to an internal removable battery pack. Alternatively, the removable battery pack may form a portion 204 of the external case of mobile telephone 100. In this alternative embodiment, thumb grip 206 may be used to slide battery pack 204 downward for removal. A latch (not depicted) or other mechanism may also be used to hold battery pack 204 in place during use. In a preferred embodiment, a headphone jack 400 is included on either or both sides of mobile telephone 100, as shown in FIG. 4. Mobile telephone 100 is preferably constructed from a resilient water-resistant material to allow mobile telephone 100 to be used in a variety of environments and under a variety of conditions without damaging the internal electronics.

Figure 5:
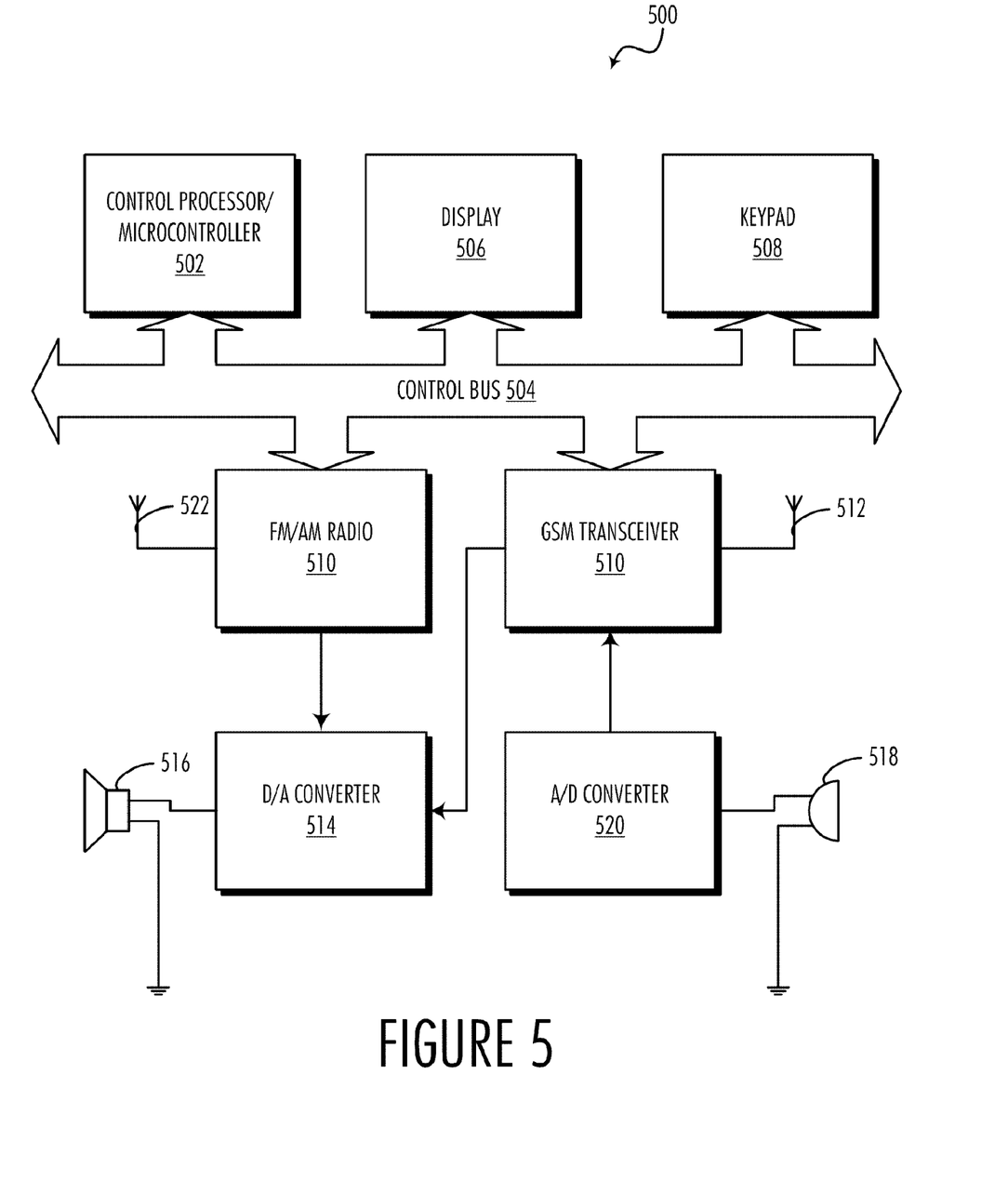
FIG. 5 is a block diagram illustrating an electronic hardware system providing the computational and telecommunications platform for a preferred embodiment of the present invention.
Figure 6:
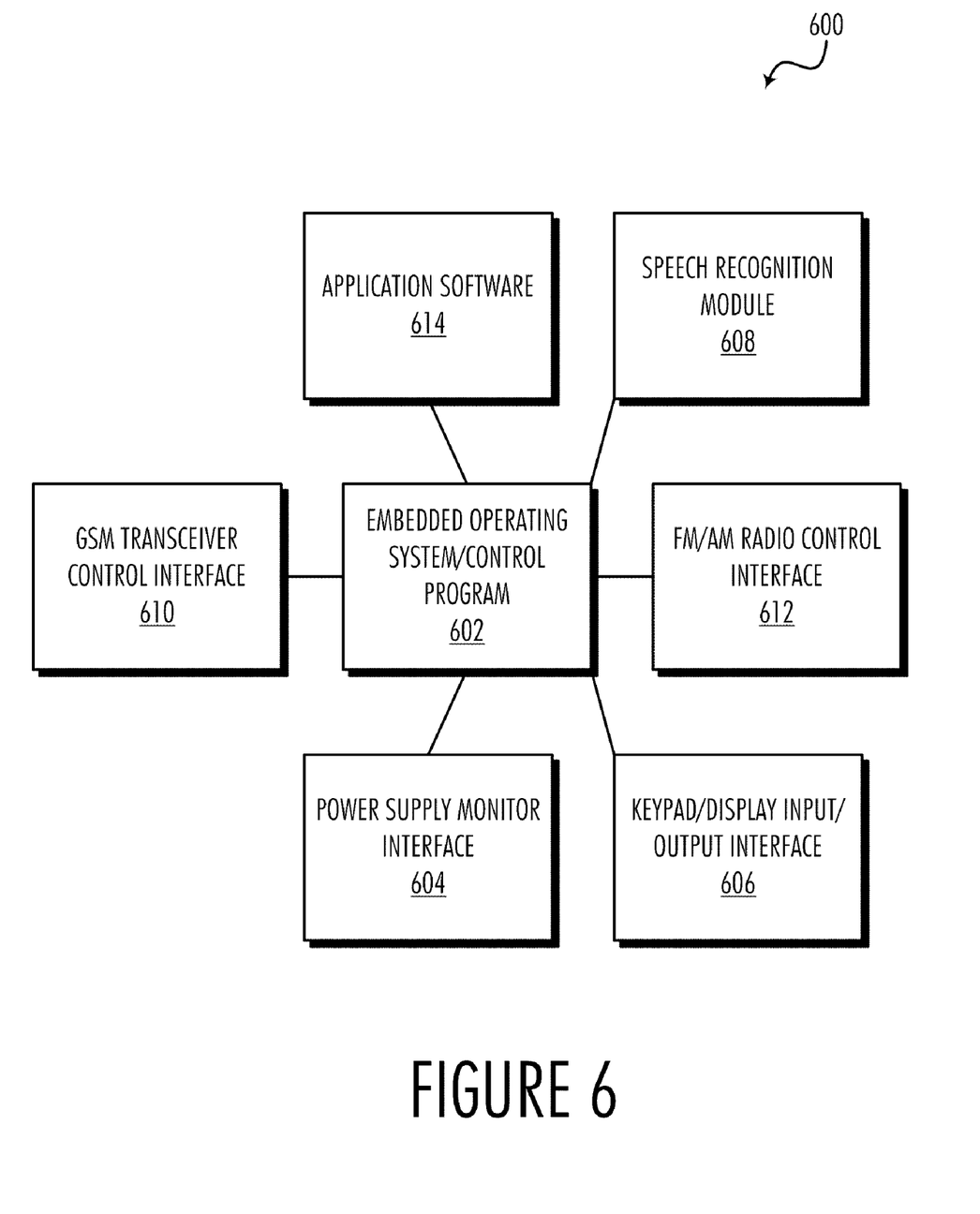
FIG. 6 is a diagram illustrating software systems and their interrelationships in a preferred embodiment of the present invention.

FIG. 5 is a block diagram illustrating an electronic hardware system 500 providing the computational and telecommunications platform for a preferred embodiment of the present invention. A control processor 502 provides a central point of control for the mobile telephone. Preferably, control processor 502 comprises some form of microcontroller, digital signal processor, or embedded processor core (such as an ARM 7 processor core, produced by ARM, Ltd. of Cambridge, England, for example), programmed with software for controlling the operation of the mobile telephone. A preferred embodiment of such software is depicted in FIG. 6.

A control bus 504 connects control processor 502 the other hardware components of system 500. Display 506 represents the hardware interface to LCD display 118 depicted in FIG. 1. Similarly, keypad 508 represents the hardware interface to keypad 106 in FIG. 1.

Also connected to control bus 504 is GSM transceiver 510. GSM transceiver 510 is the portion of system 500 that handles the encoding, decoding, transmission, and reception of digital voice and data signals over the wireless telephone network, as well as the connection and termination of wireless telephone calls. In this preferred embodiment transceiver 510 encodes, decodes, transmits, and receives according to the international GSM (Global System for Mobile telecommunications) standard, although one skilled in the art will recognize that any of a number of different communications standards can be used in an embodiment of the present invention without departing from the scope and spirit of the present invention. An ultra high-frequency (UHF) antenna 512 is provided for transmission and reception of mobile telephone signals.

Digital audio signals received by GSM transceiver 510 are converted by digital-to-analog (D/A) converter 514 into a continuous analog signal that is output by speaker 516 (through earpiece 102 in FIG. 1). Analog audio input is received by microphone 518, converted into digital form by analog-to-digital (A/D) converter 520, and fed into GSM transceiver 510 for transmission over the wireless telephone network.

FM/AM radio module 510 receives broadcast radio signals through one or more antennas having a suitable frequency range (medium-frequency/MF and very-high-frequency/VHF), represented here by broadband antenna 516. One of ordinary skill in the art will recognize that such antenna(s) may be constructed so as to be located on the exterior of mobile telephone 100 (FIG. 1), as in the case of a vertical whip antenna, or in the interior of mobile telephone 100, as in the case of a loop stick antenna, for example. Although it is theoretically possible for FM/AM radio module 510 to share an antenna with GSM transceiver 510, the significant differences in frequency ranges needed for broadcast radio reception and wireless telephony are more simply addressed, in practice, through the use of separate antennas. FM/AM radio module 510 may itself generate an analog audio signal as output, or it may, as in FIG. 5, generate a digital audio signal that is then converted into an analog audio signal by D/A converter 514. As digital signal processing and software-defined radio become more prevalent, it will become increasingly practical to implement FM/AM radio module 510 as a digital subsystem (utilizing a digital signal processor, for example). A number of analog "radios-on-a-chip" are currently available, however, and may be also used in the context of an embodiment of the present invention.

Returning now to control processor 502, control processor 502 coordinates and controls the operation of the other components in system 500. Control processor 502 takes user input from keypad 508, as well as digital audio data from A/D converter 520 and microphone 518 and directs the components of system 500 to perform the task(s) requested by the user. For example, when the user issues a verbal request to tune to a particular radio station, the audio signal for the request is received by microphone 518, converted into digital form by A/D converter 520, and relayed by GSM transceiver 510 onto control bus 504, for reading by control processor 502. Control processor 502 reads the audio signal, recognizes the voice command, and directs FM/AM radio module 510 to tune to the desired station and produce audio on speaker 516, via D/A converter 514. Likewise, when the user dials a telephone number using keypad 508, this input is read by control processor 502 over control bus 504, and in response, control processor 502 directs GSM transceiver 510 to initiate a wireless telephone connection to the desired telephone number.

FIG. 6 is a diagram illustrating the software systems 600 executed by control processor 502 and their interrelationships in a preferred embodiment of the present invention. Central control is provided by an embedded operating system or control program 602, which acts as the common interface connecting all of the other software components executed by control processor 502. Control program 602 has the responsibility of interpreting the mobile telephone's various inputs (verbal, wireless, keypad, power supply status, etc.) and directing the other subsystems of the mobile telephone to act properly in response to those inputs.

A power supply monitor interface module 604 contains program code for monitoring the state of the mobile telephone's power supply, for the purpose of conserving power or informing the user of the telephone's current power level. Keypad/display input/output interface code 606 is used to receive and decode input from keypad 508, as well as encode and present output on display 506. A speech recognition module 608 decodes digital audio data received from A/D converter 520 and recognizes words or phrases that represent commands. Those commands, when recognized by speech recognition module 608, are relayed to control program 604, which takes appropriate action in compliance with the commands.

A GSM transceiver control interface module 610 has the responsibility of translating information back and forth between control program 602 and GSM transceiver 510. When the user wishes to dial a telephone number, for example, the user's request is received by control program 602 through either keypad/display input/output interface 606 or speech recognition module 608. Control program 602 then utilizes GSM transceiver control interface module 610 to direct GSM transceiver 510 to make a wireless connection and place the telephone call.

Similarly, FM/AM radio control interface module 612 translates information back and forth between control program 602 and FM/AM radio module 510. For example, control program 602 can issue a request to FM/AM radio control interface module 612 to determine what frequency FM/AM radio module 510 is currently tuned to. Likewise, control program 602 can direct FM/AM radio module 510, via FM/AM radio control interface module 612, to tune to a particular frequency or the adjust the signal volume in response to user requests received as audio or keypad input.

Finally, application software 614 for performing additional tasks may be present in system 600 for execution by control processor 502. Some examples of additional applications may include, but are not limited to, a phone book application for storing frequently dialed numbers, a calendar or appointment book program, a wireless browser for viewing Wireless Markup Language (WML) pages, game software, or setup/configuration software for setting user options. One of ordinary skill in the art will recognize that a number of such applications exist in the art and that control processor 502, which will typically have general computing capabilities, will be capable of executing a virtually limitless variety of different types of software. The types of application software described here should be interpreted as mere examples and not be construed as limiting the scope of the present invention.

Figure 7:
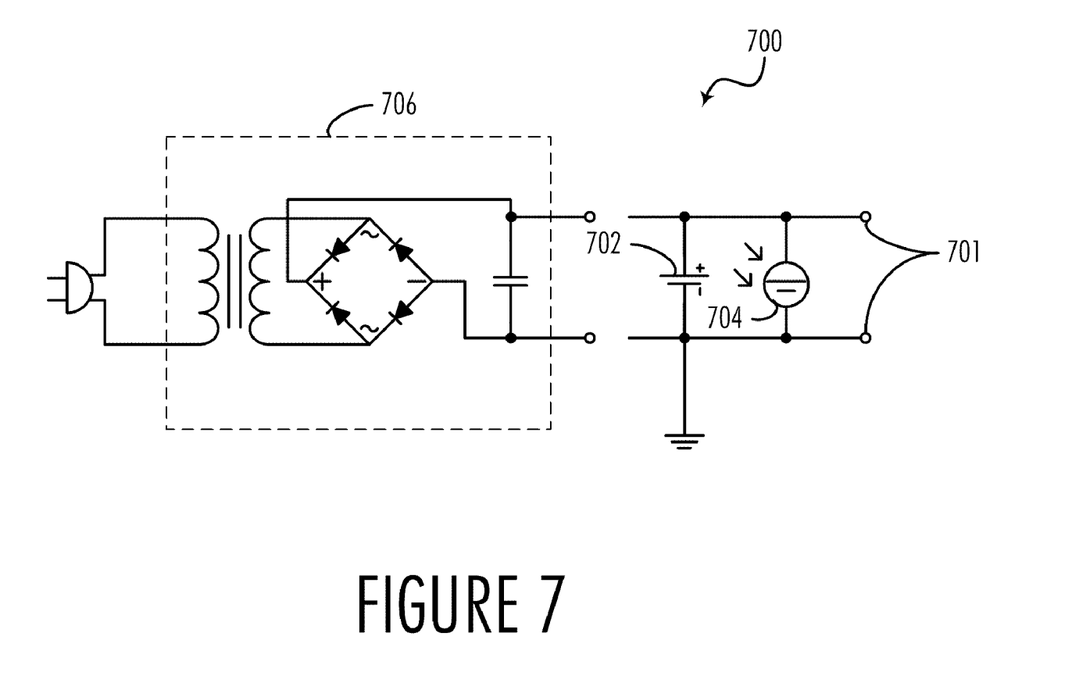
FIG. 7 is a conceptual schematic diagram illustrating the relationships between various power sources in a preferred embodiment of the present invention.

FIG. 7 provides a conceptual schematic diagram illustrating the relationships between various power sources in a preferred embodiment of the present invention. As stated previously, a preferred embodiment of the present invention utilizes a solar power source in addition to battery power. Power supply circuit 700 illustrates the ability of a preferred embodiment of the present invention to utilize three sources of power, namely alternating current (AC) "line" or "mains" power, battery power, and solar power. Terminals 701 represent the point of connection between power supply circuit 701 and the power-consuming components of mobile telephone 100. One of ordinary skill in the art will note that power supply circuit 700 is represented here in a very simplified form for illustration purposes only. An actual embodiment of the present invention will likely include additional components, such as voltage regulators, silicon controlled rectifiers (SCRs), capacitors, and the like, for ensuring that power supply circuit 700 provides a stable and reliable source of power. The inclusion of these components from FIG. 7 is not essential for a conceptual understanding of the present invention and are the subject of routine engineering judgment, however, and so these additional components have been left out of FIG. 7 for the purpose of promoting clarity.

In this preferred embodiment, battery 702 is preferably a removable, rechargeable battery pack. In one embodiment of the present invention, solar array 120 (FIG. 1) is removable, and battery 702 may physically located beneath solar array 120, such that battery 702 may be accessed and replaced by temporarily removing solar array 120 (by using thumb grip 202 to slide assembly 200 off of mobile telephone 100, as shown in FIG. 2). Battery 702 is preferably constructed in a small size (watch- or coin-sized) to allow for easy replacement. Alternatively, battery 702 may constitute a removable part of the external case of mobile telephone 100 (for example, as part of the back side of mobile telephone 100, e.g., battery pack 204 in FIG. 2).

Figure 3B:
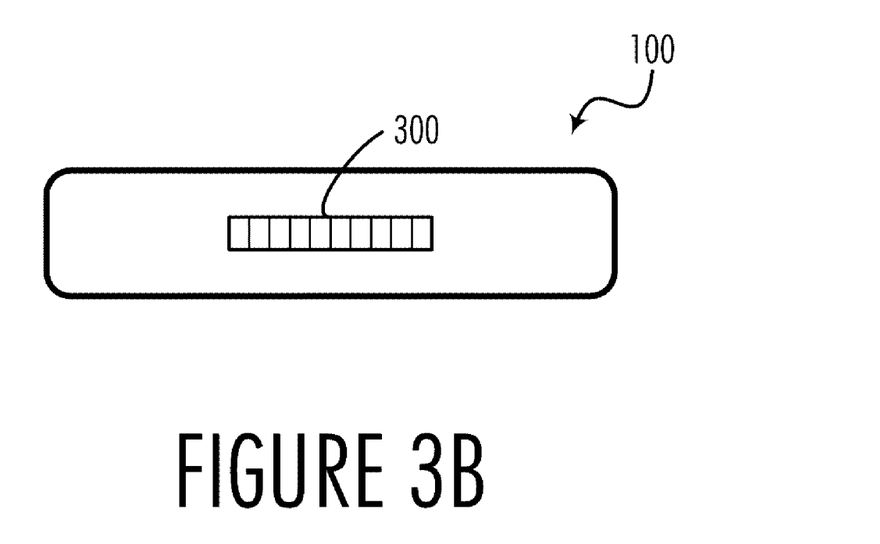
FIG. 3B is a pictorial diagram depicting a bottom view of a mobile telephone constructed in accordance with a preferred embodiment of the present invention.

A solar cell array 704 is connected (generally speaking) in parallel with battery 702 to provide an additional source of power. Since solar cell array 704 provides a supplemental source of current in the presence of an external light source, the current drain from battery 702 is reduced, thus preserving the life of battery 702 between charges. Furthermore, when power demand is low (e.g., when mobile telephone 100 is turned off or is not transmitting) solar cell array 704 may be used to recharge battery 702. A removable alternating current (AC) adapter 706 is also provided for recharging battery 702 with line or mains power (e.g., 110 V, 60 Hz AC in the United States). AC adapter 706 rectifies and filters an AC electric current to obtain a DC current that can be applied to the terminals of battery 702 to recharge battery 702 or to operate mobile telephone in the absence of other power sources. AC adaptor may be connected to mobile telephone 100 through an adapter terminal or jack, such as adapter terminal 300 in FIG. 3B.

Figure 8:
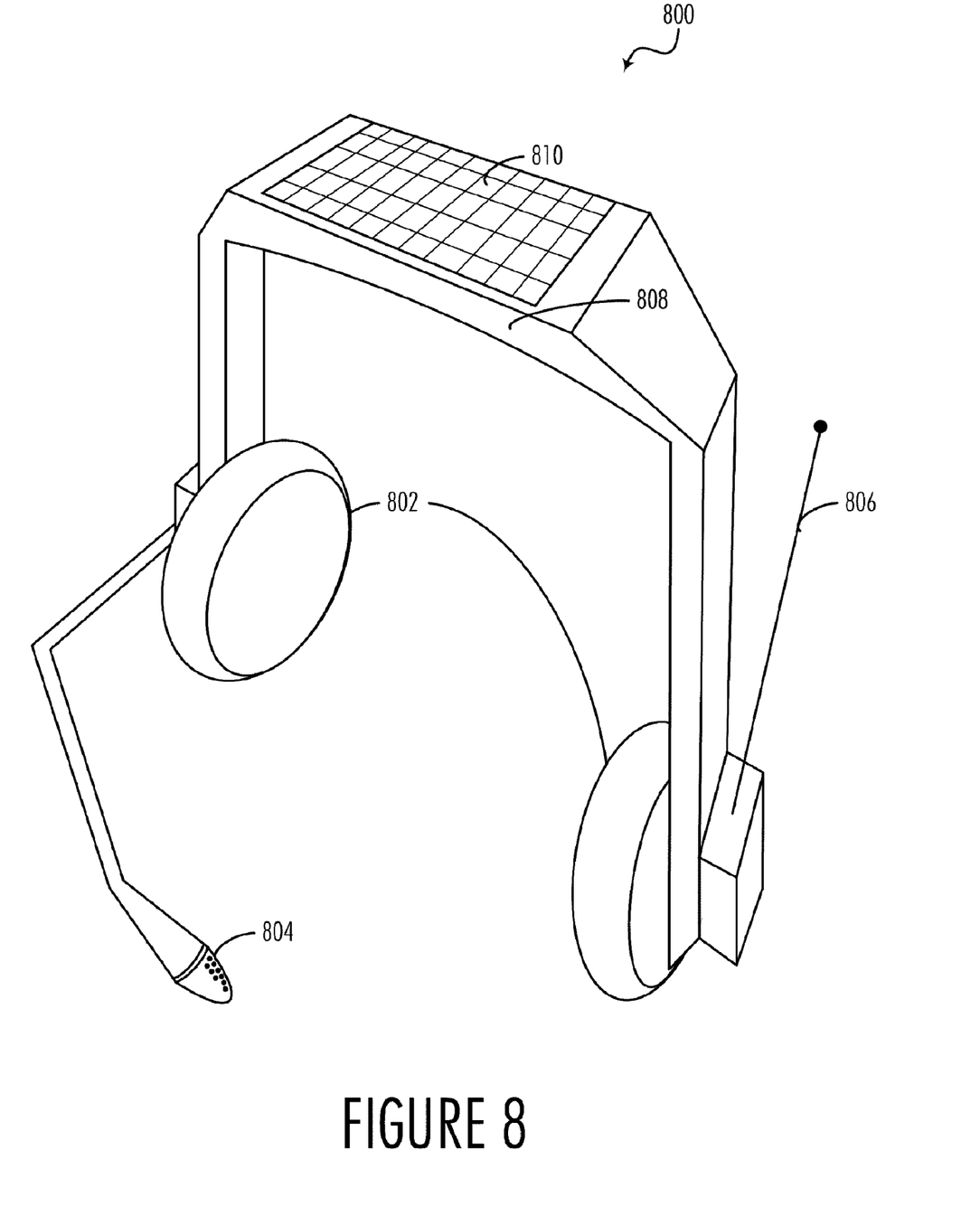
FIG. 8 is a pictorial diagram depicting an alternative embodiment of the present invention in which the apparatus takes the form of a headset.

FIG. 8 is a pictorial diagram depicting an alternative embodiment of the present invention in which the apparatus takes the form of a headset 800. Like mobile telephone 100 in FIG. 1, headset 800 is a self-contained solar mobile telephone. Also, like mobile telephone 100, headset mobile telephone 800 is constructed from a resilient, water resistant material. Earpieces 802 provide monaural audio output for wireless telephonic communications and stereo audio output for broadcast radio transmissions (when available). A microphone 804 extends from headset mobile telephone 800 to a position in front of the user's face to allow hands-free operation. Microphone 804, in a preferred embodiment, may be rotated upward when not in use. A vertical whip antenna 806 for wireless telephonic transmission and reception is also shown extending from headset mobile telephone 800. Headband portion 808 of headset mobile telephone 800 contains the internal electronics for control, input/output, power supply, speech recognition, telephone and radio. To make the electronics fit more easily in headband portion 808, a preferred embodiment uses a system-on-a-chip (SoC) design to allow most, if not all, of the electronic systems to be fabricated on a single, monolithic integrated circuit. In one embodiment, headband portion 808 may also contain one or more low-profile antenna(s), such as a folded dipole antenna, loopstick antenna, or microstrip antenna. A solar cell array 810 is positioned on the upper surface of headband portion 808 for optimal reception of solar energy. In this embodiment, solar cell array 810 forms a hinged access panel or "lid" that may be opened to allow access to input/output controls, as depicted in FIG. 9.

Figure 9:
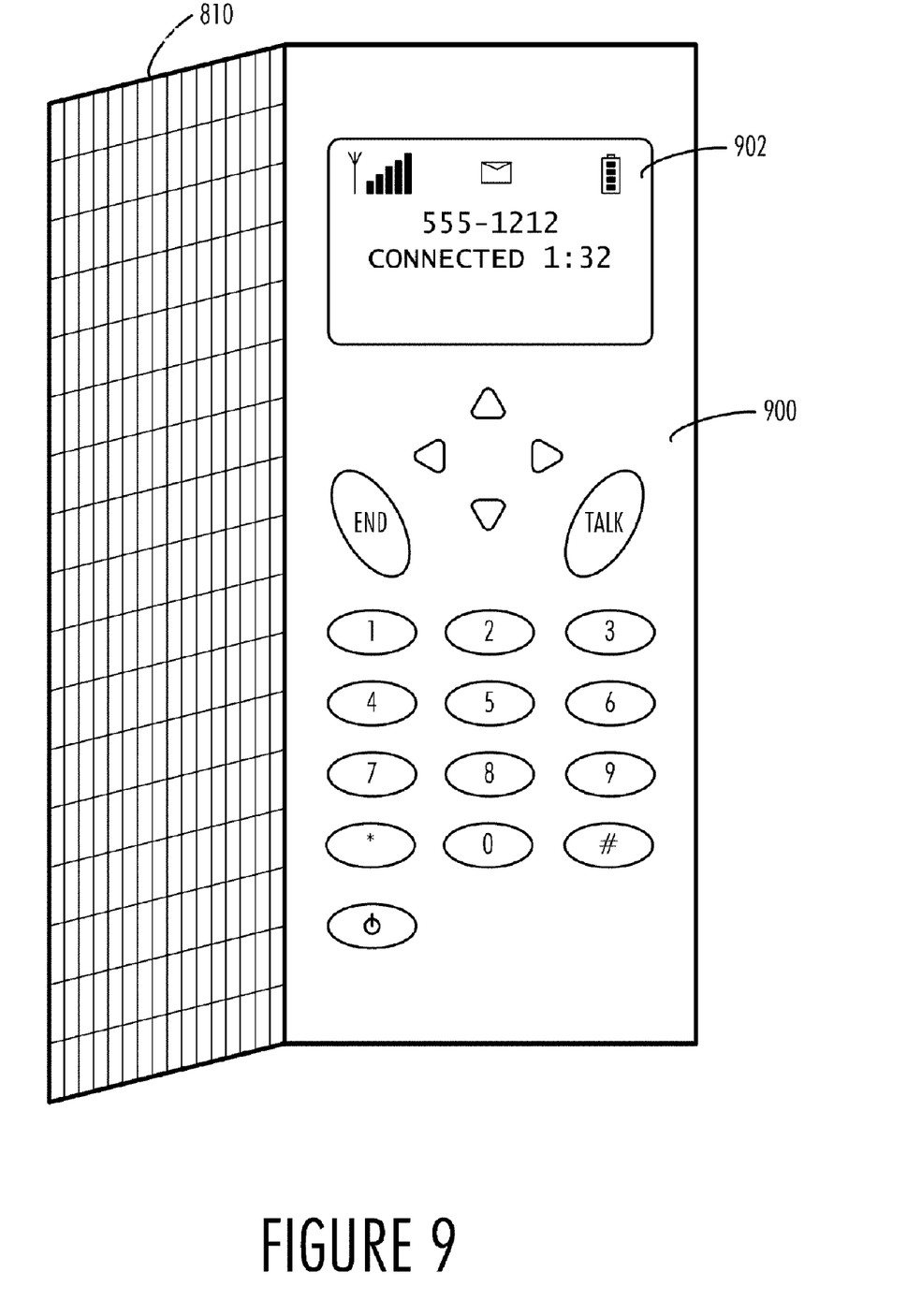
FIG. 9 is a diagram illustrating a solar array lid and control panel associated with the alternative embodiment of the present invention contained in FIG. 8.

FIG. 9 shows solar cell array lid 810 in an open position, thus revealing a control panel comprising keypad 900 and LCD display 902, which may be used to operate headset mobile telephone 800 in much the same way as keypad 106 and display 118 of mobile telephone 100 (FIG. 1). As can be observed from FIG. 9, solar cell array lid 810 is covered with solar cells on both sides, so as to allow solar cell array lid 810 to supply power even when solar cell array lib 810 is opened to expose keypad 900 and LCD display 902. Headset mobile telephone 800 may also be operated under voice control through microphone 804, just as mobile telephone 100. One of ordinary skill in the art will recognize that the hardware and software system teachings provided in FIG. 5 and FIG. 6 and the accompanying text apply equally to headset mobile telephone 800.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting examples, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A headset apparatus comprising:

a headband member adapted to conform to a user's head;

at least one earpiece associated with the headband member;

a microphone adapted to be positioned so as to allow a user to talk into the microphone;

a wireless telephone transceiver physically incorporated into the headset apparatus and adapted to place telephone calls in a wireless telephone network, wherein the wireless telephone transceiver receives an audio input signal from the microphone and outputs an audio output signal from the at least one earpiece; and a solar power source associated with the wireless telephone transceiver such that the solar power source supplies power to the wireless telephone transceiver, wherein the solar power source comprises an array of solar cells, and the array of solar cells is positioned on a surface of the headband member so as to provide exposure of the array of solar cells to an external light source, and wherein the array of solar cells is positioned on at least one surface of a lid associated with the headband member, and wherein the lid is configured such that opening the lid reveals a control panel for operating the wireless telephone transceiver.

2. The apparatus of claim 1, further comprising: a battery, wherein the battery supplies power to the wireless telephone transceiver.

3. The apparatus of claim 2, wherein the solar power source is configured to recharge the battery.

4. The apparatus of claim 3, wherein the solar power source is configured to recharge the battety during periods of low power consumption by the wireless telephone transceiver.

5. The apparatus of claim 1, further comprising:

a processor;

circuitry associating the processor and the microphone such that the circuitry presents audio information from the microphone to the processor in a form that the processor can accept; and speech recognition software executed by the processor, wherein the speech recognition software identifies verbal commands contained within the audio information, and wherein the processor performs actions in response to the identified verbal commands.

6. The apparatus of claim 5, wherein the verbal commands include a desired telephone number to dial.

7. The apparatus of claim 5, further comprising:
a broadcast radio receiver module, wherein the verbal commands include a receiver frequency for the broadcast radio receiver module.

8. The apparatus of claim 1, further comprising: a broadcast radio receiver module.

* * * * *